(12) United States Patent
Umesako (10) Patent No.: US 7,502,073 B2
(45) Date of Patent: Mar. 10, 2009

(54) SIGNAL PROCESSOR

(75) Inventor: Minoru Umesako, Sanda (JP)

(73) Assignee: Panasonic Corporation, Osaka (JP)

( * ) Notice: Subject to any disclaimer, the term of this patent is extended or adjusted under 35 U.S.C. 154(b) by 1047 days.

(21) Appl. No.: 10/817,470

(22) Filed: Apr. 2, 2004

(65) Prior Publication Data

US 2004/0233997 A1  Nov. 25, 2004

(30) Foreign Application Priority Data

Apr. 4, 2003  (JP)  ............................. 2003-101254

(51) Int. Cl.
*H04N 5/46* (2006.01)

(52) U.S. Cl. .................... 348/555; 348/441; 348/558; 348/738

(58) Field of Classification Search ......... 348/553–555, 348/565, 575, 441, 445, 558, 725, 738, 705–706; 386/95–96, 131; 725/39–40; *H04N 5/46*
See application file for complete search history.

(56) References Cited

U.S. PATENT DOCUMENTS

| | | | | |
|---|---|---|---|---|
| 4,710,826 | A * | 12/1987 | Sakurai | ...................... 386/101 |
| 4,870,661 | A | 9/1989 | Yamada et al. | |
| 5,617,088 | A | 4/1997 | Yasuda | |
| 5,896,177 | A * | 4/1999 | Hwang | ........................ 348/445 |
| 6,427,048 | B2 * | 7/2002 | Ito et al. | ........................ 386/95 |
| 6,501,510 | B1 * | 12/2002 | Moon | ........................ 348/553 |
| 6,606,747 | B1 * | 8/2003 | Yuen et al. | .................... 725/40 |
| 2003/0020832 | A1 * | 1/2003 | Carlsgaard et al. | .......... 348/565 |

FOREIGN PATENT DOCUMENTS

| | | |
|---|---|---|
| JP | 02-154583 A | 6/1990 |
| JP | 2001-94906 A | 4/2001 |
| JP | 2001-211420 A | 8/2001 |
| WO | 01/72036 A2 | 9/2001 |

* cited by examiner

*Primary Examiner*—Trang U Tran
(74) *Attorney, Agent, or Firm*—Panitch Schwarze Belisario & Nadel LLP (57) ABSTRACT

A signal processor generates signals to reproduce video and audio from a received encoded digital signal. The signal processor includes: a first decoder for separating a first video signal and a first audio signal from a digital signal; a second decoder for separating a second video signal and a second audio signal from a digital signal; a video controller, which receives the first and second video signals, subjects a selected video signal to video processing; a clock generator for generating a clock signal of which the frequency corresponds to that of the first audio signal; an audio processor, which receives the second audio signal and the clock signal and converts the frequency of the second audio signal into that of the first audio signal; and an audio switch which outputs one of the two audio signals that is associated with the video signal being selected by the video controller.

4 Claims, 5 Drawing Sheets

SIGNAL PROCESSOR

BACKGROUND OF THE INVENTION

1. Field of the Invention

The present invention relates to a configuration for a circuit for processing video and audio signals.

2. Description of the Related Art

Broadcasting technologies and video- and audio-related signal encoding technologies have recently been advanced remarkably. In the telecasting field, for example, not just conventional broadcasts at a standard resolution but also so-called "Hi-Vision" broadcasts with a higher video quality have already been brought to general home users. In the field of data compression on the other hand, MPEG-2 and MPEG-4 standards were fixed so that video and audio data can be freely read from, or written on, a storage medium such as a DVD in compliance with those standards.

To make such a drive even more convenient for the users, the drive preferably has the capability of processing multiple types of signals, complying with mutually different sets of standards, by itself. Furthermore, if all necessary components of such a drive could be integrated together on a single chip, the design process of such a drive should be carried out smoothly. Unfortunately, though, the greater the number of types of signals to be processed, the more complicated the signal processor becomes and the more difficult it is to integrate all necessary components together on a single chip.

Thus, in many cases, a number of dedicated processors (blocks) are provided independently to process new types of signals quickly enough. For example, Japanese Laid-Open Publication No. 2-154583 discloses a technique of providing signal processors for two types of analog TV signals (i.e., the standard resolution signal and the Hi-Vision signal), respectively. An optical disc drive to process digital signals is also provided with a plurality of signal processors for processing signals complying with a number of data compression standards (such as the MPEG-2 and MPEG-4 standards). Hereinafter, a more specific circuit configuration will be described.

Figure 1:
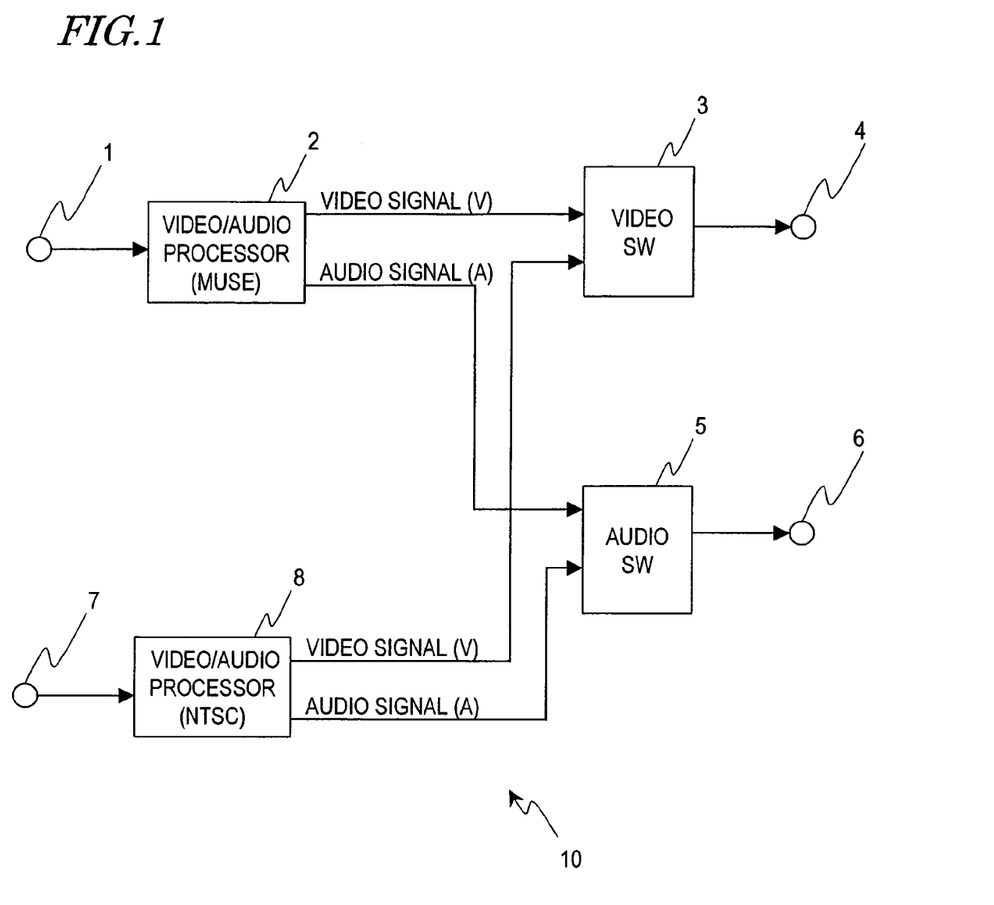
FIG. 1 is a diagram showing a configuration for an analog broadcast signal demodulator 10.

FIG. 1 shows a configuration for an analog broadcast signal demodulator 10. This demodulator 10 is supposed to be built in a TV set and have the function of processing a Hi-Vision broadcast signal complying with the MUSE standards (which will be referred to herein as an "MUSE signal") and a standard resolution signal complying with the NTSC standard (which will be referred to herein as an "NTSC signal") and outputting the processed signals to a display and loudspeakers. These signals may be received at the same time. However, usually one of the two signals is selectively processed by a tuner (not shown) according to the user's choice (i.e., tuning). Each of these signals includes an audio signal.

If the MUSE signal has been selected, then the MUSE signal is received at an input terminal 1. A video/audio processor 2 extracts video- and audio-related signals from the MUSE signal, demodulates these signals into audible and visible formats and then outputs them as video and audio signals. On the other hand, if the NTSC signal has been selected, then the NTSC signal is received at an input terminal 7. A video/audio processor 8 also extracts video- and audio-related signals from the NTSC signal, demodulates these signals into audible and visible formats and then outputs them as video and audio signals. The signals obtained from the MUSE signal are digital data. Thus, the processing performed by the video/audio processor 2 is done on that digital data. On the other hand, the signals obtained from the NTSC signal are analog data. Thus, the processing performed by the video/audio processor 8 is done on that analog data. The specific contents of these two types of processing are different from each other but the description thereof will be omitted herein because those contents have little importance.

Synchronously with the selection of the MUSE signal or the NTSC signal, a video switch 3 and an audio switch 5 choose the signal paths. Specifically, when the MUSE signal is selected, the video and audio switches 3 and 5 connect the video/audio processor 2 to a video signal output terminal 4 and an audio signal output terminal 6. Meanwhile, when the NTSC signal is selected, the video and audio switches 3 and 5 connect the video/audio processor 8 to the video signal output terminal 4 and the audio signal output terminal 6. In this manner, the video and audio signals, which have been demodulated from the broadcast signal selected, can be output through the output terminals 4 and 6, respectively.

Figure 2:
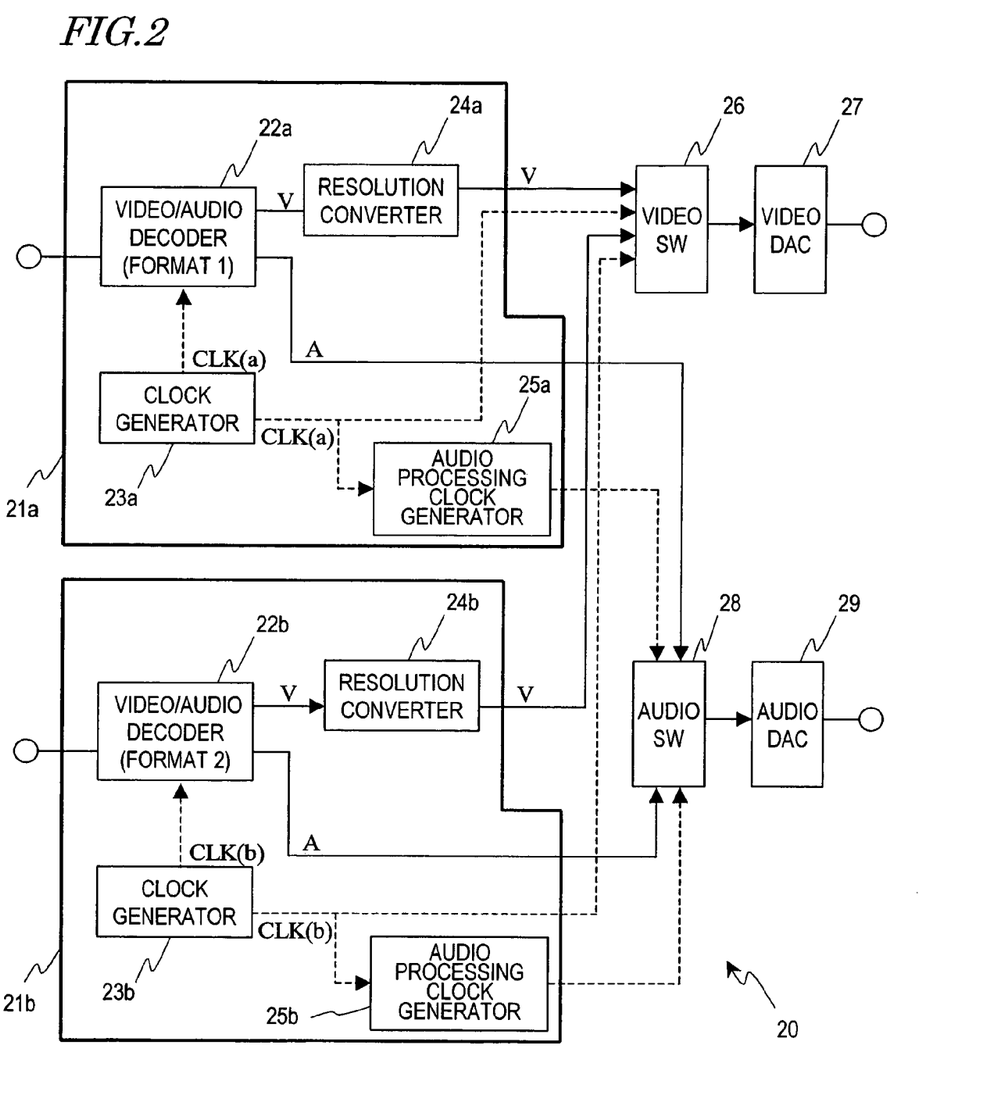
FIG. 2 is a diagram showing a configuration for a digital signal decoder 20.

On the other hand, FIG. 2 shows a configuration for a digital signal decoder 20. The decoder 20 is built in an optical disc drive, for example, decodes digital signals complying with two different sets of standards, and outputs resultant video and audio signals to a display and loudspeakers, respectively. In this example, the digital signals are an MPEG-2 program stream (which will be referred to herein as a "PS") and an MPEG-2 transport stream (which will be referred to herein as a "TS"). For example, if a DVD is loaded as a given optical disc, the decoder 20 receives a PS. But if a Blu-ray Disc (BD) is loaded, then the decoder 20 receives a TS.

In this decoder 20, a PS is supplied to, and decoded by, a processing block 21a, while a TS is supplied to, and decoded by, a processing block 21b. It will be described how the PS is decoded by the processing block 21a. First, a video/audio decoder 22a extracts video data and audio data from the PS, decodes them, and then outputs the decoded data as a video signal and an audio signal. In this process, a clock signal CLK(a) having a frequency required for the PS processing is supplied from a clock generator 23a to the video/audio decoder 22a. The resultant video signal is passed to a resolution converter 24a, while the resultant audio signal is passed to an audio switch 28. The resolution converter 24a performs resolution conversion processing, including data decimation, interpolation and telecine conversion, on the video signal received and outputs the processed video signal to a video switch 26.

The video signal and audio signal, which are output from the processing block 21a, are both non-compressed digital signals and have discrete values. The video switch 26 operates in response to the clock signal CLK(a) supplied from the clock generator 23a. Likewise, the audio switch 28 also operates in response to a clock signal. However, the audio signal processing clock pulses are different from the video signal processing clock pulses. Thus, an audio processing clock generator 25a generates an audio signal processing clock signal from the clock signal CLK(a) and supplies it to the audio switch 28.

The processing block 21b performs decoding processing on the TS in a similar procedure. The video/audio decoder 22b, clock generator 23b, resolution converter 24b and audio processing clock generator 25b of the processing block 21b have the same functions as the counterparts of the identical names as already described for the PS processing block 21a except that the processing and setting of those components are adapted to the TS, and the description thereof will be omitted herein. The video and audio signals output from the processing block 21b are non-compressed digital signals, too. Accordingly, not only the video and audio signals but also a video processing clock signal CLK(b) and an audio processing clock signal are output to the video switch 26 and audio switch 28.

The video switch 26 and audio switch 28 choose signal paths, thereby passing the video and audio signals, supplied from either the processing block 21a or the processing block 21b, to a video DAC 27 and an audio DAC 28, respectively. As a result, those digital signals are converted into analog signals and then output to an external TV set and loudspeakers, for example.

Both the analog broadcast signal demodulator 10 shown in FIG. 1 and the decoder 20 shown in FIG. 2 perform two different types of processing and change the outputs via switches according to the type of the input signal just before the processed data are eventually output. In the analog broadcast signal demodulator 10, the target of the demodulation processing is divided into digital data and analog data, and therefore, there is no choice but processing the two types of data separately until those data are eventually output.

However, if the targets of processing are two similar types of MPEG-2 based digital signals like the PS and TS, then the decoder 20 will perform technically analogous processing on both of the two signals, which causes various problems.

Firstly, two processing blocks need to be provided for the two different types of signals to be processed, thus requiring an increased number of redundant components. In the decoder 20, for example, two resolution converters 24a and 24b of the same type need to be provided. Then, the processing block of each signal should have an increased circuit scale. Consequently, the production cost rises and the power dissipation increases, too.

Secondly, if two different types of clock signals are needed for two different signals to be processed, then lines to transmit those clock signals must be extended a long distance to some components that are located next to their output terminals (e.g., the switches 26 and 28 in the example illustrated in FIG. 2). However, those extended lines would constitute big obstacles in laying out the other circuit components during a design process. Furthermore, such long transmission lines should increase unnecessary radiation within the circuit, too.

Thirdly, the conventional circuit selectively outputs just one of the two types of signals via the switches, and therefore cannot present a video using multiple types of signals (e.g., a thumbnail display or a picture-in-picture display). For that purpose, another processor is needed, thus increasing the circuit size, too.

SUMMARY OF THE INVENTION

An object of the present invention is to simplify and downsize a decoder circuit, and get ready for even a complicated display demand with good video quality maintained, by providing a minimum required processing block to decode various types of signals as an independent circuit block and sharing the other processing blocks as much as possible.

A signal processor according to the present invention receives an encoded digital signal and generates signals to reproduce video and audio from the received digital signal. The signal processor includes: a first decoder for separating a first video signal and a first audio signal in digital form from a digital signal in a first format; a second decoder for separating a second video signal and a second audio signal in digital form from a digital signal in a second format; a video controller, which receives the first and second video signals, selects at least one of the two video signals received, subjects the selected video signal to video processing for display purposes, and then outputs the processed video signal; a clock generator for generating a clock signal of which the frequency corresponds to that of the first audio signal; an audio processor, which receives the second audio signal and the clock signal and converts the frequency of the second audio signal into that of the first audio signal in accordance with the clock signal; and an audio switch, which receives the first audio signal from the first decoder and the second audio signal with the converted frequency from the audio processor, respectively, and outputs one of the two audio signals that is associated with the video signal being selected by the video controller.

The video controller may include: a video switch, which receives the first and second video signals and selectively outputs at least one of the two video signals; and a video processor, which subjects the selected video signal to the video processing for display purposes and then outputs the processed video signal.

Alternatively, the video controller may include: a resolution converter, which receives one of the first and second video signals and converts the resolution of the video signal; and a processor, which receives the other video signal and the video signal with the converted resolution, subjects the two video signals to video processing for superimpose display purposes, and then outputs the processed video signals.

As another alternative, the video controller may include: a resolution converter, which receives the first and second video signals and converts the resolutions of the video signals; and a processor, which subjects the first and second video signals with the converted resolutions to video processing for simultaneous display purposes, and then outputs the processed video signals.

A signal processor according to the present invention is provided with circuits for processing portions unique to given formats independently. However, as for the other portions, the same circuits and same reference clock signal can be shared in common, thus cutting down the cost of redundant circuits and power dissipation as well. In addition, since transmission lines do not have to be extended excessively long, those lines will not interfere with laying out other circuit components and unwanted radiation can be reduced, too. Furthermore, by providing dedicated video and audio processors for respective signal formats, various signal formats can be dealt with flexibly.

DETAILED DESCRIPTION OF PREFERRED EMBODIMENTS

Hereinafter, preferred embodiments of the present invention will be described with reference to the accompanying drawings.

Figure 3:
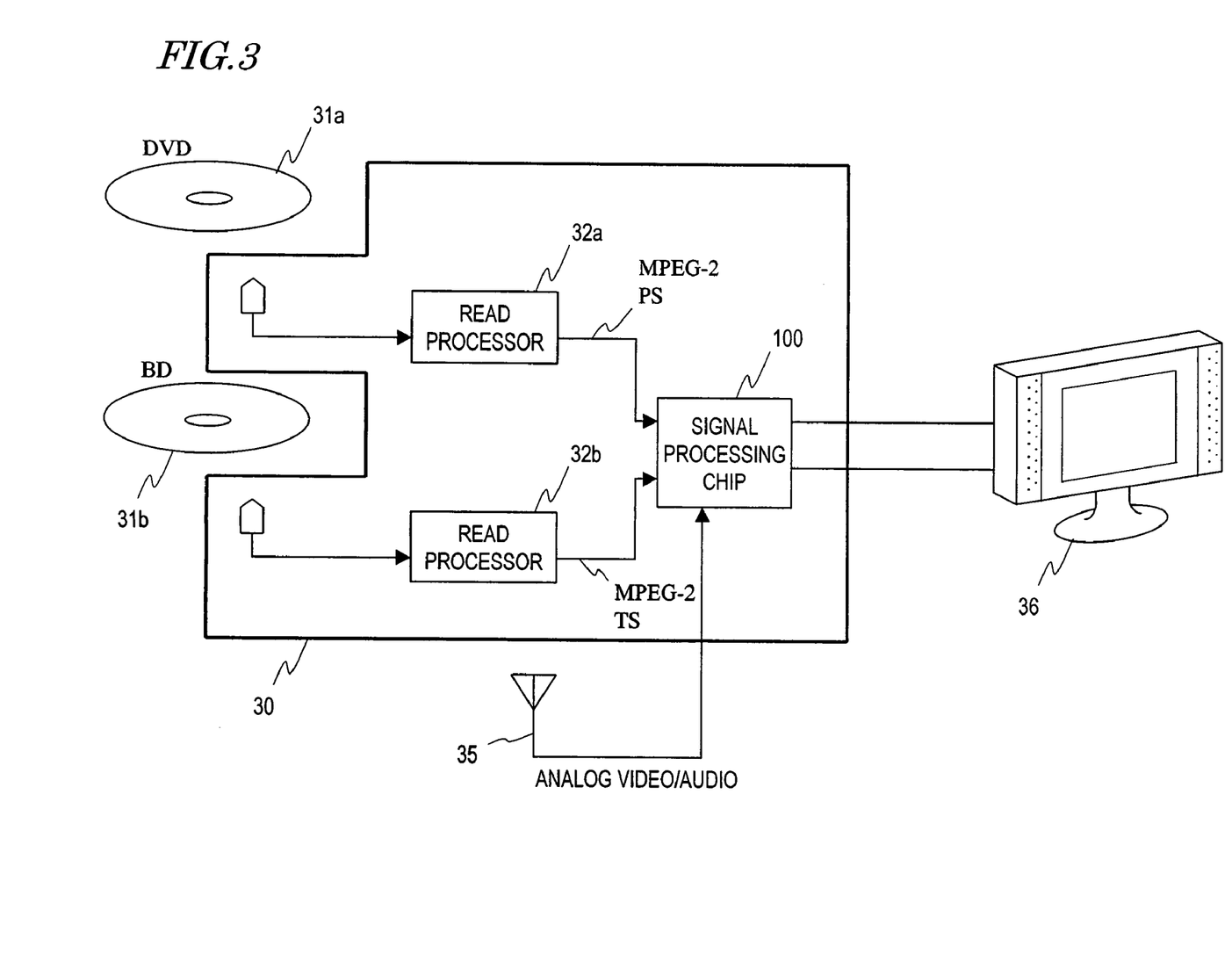
FIG. 3 is a diagram showing an arrangement of functional blocks for an optical disc drive 30 including a signal processing chip 100 according to this preferred embodiment.

FIG. 3 shows an arrangement of functional blocks for an optical disc drive 30 including a signal processing chip 100 according to this preferred embodiment. The optical disc drive 30 may be loaded with a DVD 31a and a Blu-ray Disc (BD) 31b. Video data and audio data, which were encoded as an MPEG-2 program stream (PS), are written and stored on the DVD 31a. The PS consists of a plurality of data units called "packs", each being made up of 2,048 bytes. The video and audio data are separately stored as multiple packs. On the other hand, video data and audio data, which were encoded as an MPEG-2 transport stream (TS), are written and stored on the BD 31b. The TS consists of a plurality of data units called "packets", each being made up of 188 bytes. The video data and audio data are separately stored as multiple packets. In both of these two formats, the video data has been compressed. However, the audio data may or may not have been compressed. The optical disc drive 30 can process these two types of digital signals PS and TS.

The optical disc drive 30 includes read processors 32a and 32b and a signal processing chip 100. The read processors 32a and 32b detect a semiconductor laser beam, which has been radiated toward, and reflected from, the DVD 31a and BD 31b, thereby reading the PS and TS as digital signals. The read processors 32a and 32b are so-called "optical disc controllers". The read processors 32a and 32b are illustrated as two separate blocks in FIG. 2 but may be combined into a single optical disc controller.

The signal processing chip 100 is a signal processor including a plurality of semiconductor devices, for example, and receives and decodes the PS and TS as digital signals, thereby generating a video signal and an audio signal. The video and audio signals are output to a display 36, which is connected to the optical disc drive 30. A video is reproduced from the video signal on the screen of the display 36 and sound is reproduced from the audio signal through loudspeakers thereof. A detailed configuration for the signal processing chip 100 will be described later.

The optical disc drive 30 also has the function of recording a broadcast program. For example, the optical disc drive 30 may receive an analog TV broadcast signal via an antenna 35 and get a PS or a TS generated by the signal processing chip 100 according to the type of the optical disc loaded. More specifically, if the optical disc drive 30 is loaded with the DVD 31a, a PS is generated and written on the DVD 31a. On the other hand, if the optical disc drive 30 is loaded with the BD 31b, a TS is generated and written on the BD 31b. Although no particular processors for writing are illustrated in FIG. 3, the optical disc controllers, functioning as the read processors 32a and 32b, may be regarded as having the additional function of writing data on the DVD 31a and BD 31b. However, specific processing of these optical disc controllers is out of the scope of the present invention, and the description thereof will be omitted herein.

Hereinafter, the configuration of the signal processing chip 100 will be described with reference to FIG. 4. First, portions of the signal processing chip 100 for processing the digital signals PS and TS representing data to be read out will be described. Thereafter, other portions of the signal processing chip 100 for processing the analog broadcast signal representing data to be written will be described.

Figure 4:
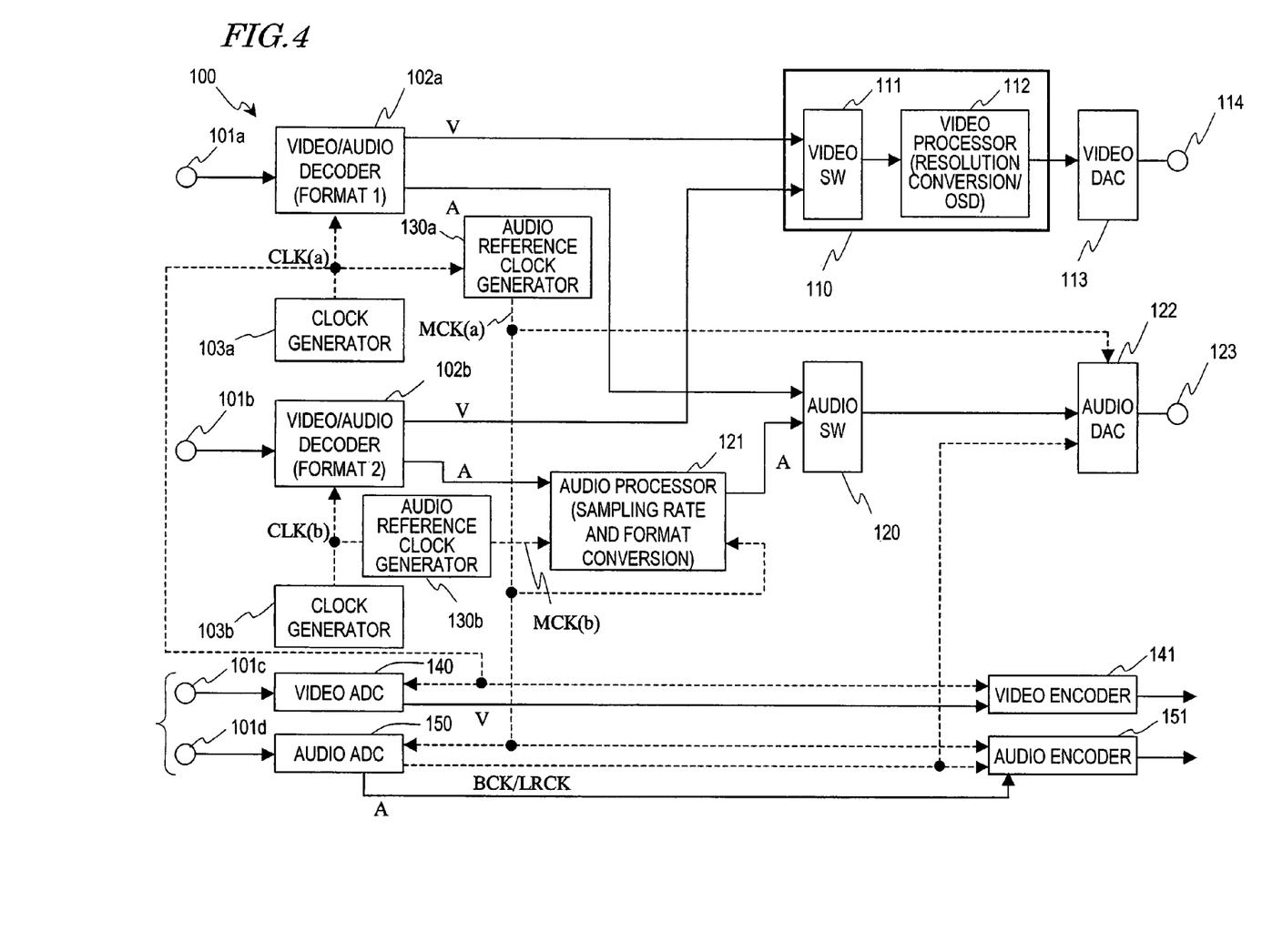
FIG. 4 is a diagram showing a configuration for the signal processing chip 100.

FIG. 4 shows a configuration for the signal processing chip 100. The signal processing chip 100 receives the PS at an input terminal 101a and the TS at another input terminal 101b, respectively.

The PS received at the input terminal 101a is input to a video/audio decoder 102a. On receiving the PS, the video/audio decoder 102a separates the PS into video packs and audio packs. Thereafter, the video/audio decoder 102a retrieves the video and audio data from the respective packs.

The video data included in the PS has been compressed so as to comply with the MPEG-2 standards. The video/audio decoder 102a decodes the video data, thereby outputting a non-compressed digital video standard signal (e.g., REC 656 or 601). This non-compressed digital video standard signal is then input to a video controller 110 to be described later.

On the other hand, the audio data may have been compressed so as to comply with the AC-3 standard, for example, or may not have been compressed at all as in PCM. In any case, however, the audio data has been coded anyway. Thus, the video/audio decoder 102a processes the audio data, thereby outputting the digital data to an audio switch 120.

The video/audio decoder 102a receives a clock signal CLK (a) from a clock generator 103a. The clock signal CLK(a) may have a frequency of 27 MHz, for example. From this clock signal CLK(a), the video/audio decoder 102a obtains 27 MHz clock pulses, which are needed to process the MPEG-2 video signal, thereby performing the decoding process described above.

The clock generator 103a outputs the clock signal CLK(a) to the video/audio decoder 102a, an audio reference clock generator 130a, an analog-to-digital converter 140 and a video encoder 141. The audio reference clock generator 130a will be described first, and the analog-to-digital converter 140 and video encoder 141, which makes up an analog video recording system, will be described later. The audio reference clock generator 130a includes a known phase locked loop (PLL) (not shown). This clock generator 130a gets the frequency of the input clock signal CLK(a) divided by the PLL, thereby generating a master clock signal MCK(a) required for digital audio processing. For example, the audio reference clock generator 130a may receive audio data with an audio sampling frequency of 48 kHz from the DVD 31a and gets that frequency divided by the PLL, thereby generating a master clock signal MCK(a) with a frequency of 36.864 MHz. The master clock signal MCK(a) generated in this manner is used to process the audio signal in the signal processing chip 100. The master clock signal MCK(a) is supplied to an audio digital-to-analog converter (DAC) 122 and an audio processor 121 as will be described later.

If audio data having a sampling frequency of 44.1 kHz, adopted in a compact disc (CD), for example, has been received, then the audio reference clock generator 130a generates a master clock signal MCK(a) with a frequency of 33.8688 kHz.

The TS received at the input terminal 101b is input to a video/audio decoder 102b. On receiving the TS, the video/audio decoder 102b extracts TS packets, on which the video and audio data are stored, from the TS packets of the TS. Thereafter, the video/audio decoder 102b retrieves the video and audio data from the respective packets.

The video data included in the TS has been compressed so as to comply with the MPEG-2 standards. Accordingly, after having acquired the video data, the video/audio decoder 102b performs the same processing as the video/audio decoder 102a, thereby generating a non-compressed digital video standard signal (e.g., REC 656 or 601) and outputting it to the video controller 110. Also, as for the audio data, the video/audio decoder 102b processes it in the same way as the video/audio decoder 102a, thereby outputting the resultant digital signal to an audio processor 121. It should be noted that the video/audio decoder 102b receives a clock signal CLK(b) from a clock generator 103b and operates in response to the clock signal CLK(b). The clock signal CLK(b) may have a frequency of 27 MHz, for example. From this clock signal CLK(b), the video/audio decoder 102b obtains 27 MHz clock pulses, which are needed to process the MPEG-2 video signal, thereby performing the decoding process described above.

The clock generator 103b outputs the clock signal CLK(b) to an audio reference clock generator 130b, too. The audio reference clock generator 130b includes a known phase locked loop (PLL) (not shown). The audio reference clock generator 130b gets the frequency of the input clock signal CLK(b) divided by the PLL, thereby generating a master clock signal MCK(b) required for digital audio processing. For example, the audio reference clock generator 130b may receive audio data with an audio sampling frequency of 48 kHz and gets that frequency divided by the PLL, thereby generating a master clock signal MCK(b) with a frequency of 36.864 MHz. The master clock signal MCK(b) generated in this manner is used to process the audio signal in the signal processing chip 100. The master clock signal MCK(b) is supplied to the audio digital-to-analog converter (DAC) 122 and audio processor 121 as will be described later.

The video/audio decoders 102a and 102b need to perform unique types of processing according to the data structures of the PS and TS, respectively. Thus, in the configuration disclosed herein, the video/audio decoders 102a and 102b are treated as indispensable sections for performing demodulation processing according to the PS and TS formats, respectively, and share no components in common.

The video controller 110 includes a video switch 111 and a video processor 112. The video switch 111 selects at least one of the two output video signals of the video/audio decoders 102a and 102b. The video processor 112 acquires video data from the video signal that has been selected by the video switch 111, temporarily stores it in a buffer memory (not shown) and performs predetermined video processing thereon. For example, the video processor 112 may convert the resolution of the video according to that of the display 36 connected to a video output terminal 114. Also, the video processor 112 may synthesize together the original video data and information about the status of the optical disc drive 30 and a signal bit rate, for example. Such a video synthesis function is called an on-screen display (OSD) function. The output video data of the video processor 112 is supplied as a digital signal to the digital-to-analog converter (video DAC) 113. In response, the video DAC 113 converts the digital video signal into an analog video signal and then outputs it as a read signal to the display 36 by way of the video output terminal 114.

Next, the audio processor 121 will be described. The audio processor 121 receives a digital audio signal from the video/audio decoder 102b. This digital audio signal has been generated in response to the clock signal CLK(b) supplied from the clock generator 103b. Accordingly, the digital audio signal is also a discrete signal, of which the sampling frequency is equal to the frequency of the clock signal CLK(b).

The audio processor 121 receives not only the digital audio signal from the video/audio decoder 102b but also master clock signals MCK(a) and MCK(b) from audio reference clock generators 130a and 130b, respectively. And the audio processor 121 converts the digital audio signal, generated in response to the clock signal CLK(b), into a different digital audio signal, which is not synchronized with the clock signal CLK(b) but with the master clock signal MCK(a).

The audio processor 121 preferably matches the frequency of the digital audio signal supplied from the video/audio decoder 102b with that of the master clock signal MCK(a). This is advantageous because when the audio switch 120 switches the signal paths synchronously with switching of the data streams to be processed (i.e., from the PS into the TS, or vice versa), the digital audio signals are in phase with each other before and after the switching. Then, the discrete data will be input at the same regular intervals even at the switching point. Consequently, the data streams to be read can be switched with any unnatural switching (e.g., discontinued sound) avoided.

The audio processor 121 further has the function of converting the sampling frequency (or sampling rate) of the digital signal and the function of converting the bit length and signal format of the digital audio signal. If the specifications of the subsequent audio DAC 122 are defined so as to process the output signal of the video/audio decoder 102a and the master clock signal MCK(a), these functions can contribute to adapting the output signal of the video/audio decoder 102b to those specifications.

The sampling frequency of the digital audio signal may be converted in the following manner, for example. Suppose the master clock signal MCK(b) has a frequency of 2f (Hz) and the master clock signal MCK(a) has a frequency of f (Hz). The digital audio signal, just received from the video/audio decoder 102b, has discrete data values that were sampled at a sampling frequency of 2f (Hz). If every other one of these discrete data values is decimated, then the digital audio signal will have discrete data values that have the same frequency of f (Hz) as that of the master clock signal MCK(a). In this manner, the sampling frequency is converted. This conversion processing is just an exemplary one. Other exemplary sampling frequency conversion processes are described in Japanese Laid-Open Publication No. 63-086932 and Japanese Laid-Open Publication No. 07-212190, the disclosures of which are hereby incorporated by reference.

On the other hand, the signal format conversion processing is done to unify various bit lengths and data formats of audio data into a single bit length and a single data format. For example, suppose the video/audio decoder 102b outputs data according to a "24-bit LSB (least significant bit) justified" data format and the audio DAC 122 to be described later outputs data according to a "32-bit MSB (most significant bit) justified" data format. As used herein, the "24-bit LSB justified" refers to a formatting technique by which when the audio data has a length of p bits (where p is an integer of 1 through 24) and the output data has a length of 24 bits, the LSB of the audio data is matched up with the counterpart of the 24-bit data unit first, following high-order bits are arranged one by one until all p bits of the audio data have been stored, the remaining high-order bits of the data unit are stuffed with zeros such that the data length thereof is adjusted, and then the resultant data unit is output. On the other hand, the "32-bit MSB justified" refers to a formatting technique by which when the audio data has a length of q bits (where q is an integer of 1 through 32), the MSB of the audio data is matched up with the counterpart of the 32-bit data unit first, following low-order bits are arranged one by one until all q bits of the audio data have been stored, the remaining low-order bits of the data unit are stuffed with zeros such that the data length thereof is adjusted, and then the resultant data unit is output.

When receiving the 24-bit LSB justified data, the audio processor 121 needs to convert the data format of that data into the 32-bit MSB justified. Thus, the audio processor 121 matches up the MSB of the received 24-bit LSB justified data with the counterpart of the 32-bit data unit, and then arranges the low-order bits one by one. The audio data of DVDs normally have data units with lengths of 16 to 24 bits, while the audio data of CDs usually have data unit with a length of 16 bits.

To process audio data of various bit lengths, the MSB justified data formats are preferred to the LSB justified data formats. The reason is that data start being exchanged with the MSBs in audio processing. Accordingly, even if the bit length is variable within the range of 16 through 24 bits, all bits but those representing effective data are preferably processed as zeros. Then, the digital-to-analog conversion can be done without changing the control modes of the audio DAC 122. That is why a lot of audio DACs for performing MSB justified processing are being developed. Nevertheless, a chip for outputting data according to the LSB justified data format could be used as the video/audio decoder 102b. In view of these considerations, it is quite imaginable that the format conversion described above is required in audio data processing. It should be noted that the numerical values mentioned above are just examples. Thus, it would be easy for those skilled in the art to convert one data format into another using other numerical values by reference to this description of preferred embodiments.

The audio processor 121 preferably performs the sampling frequency conversion, signal format conversion, and other types of processing. Then, even if the sampling frequency or signal format of the digital audio signal output from the video/audio decoder 102b is different from that of the digital audio signal output from the video/audio decoder 102a, the former sampling frequency or signal format can be converted into the latter. It should be noted that such an adjustment is not necessary for a video signal. This is because a video signal is stored as video data in the buffer of the video processor 112 and the frequency and data length of the video signal are unified automatically.

The audio processor 121 sends the digital audio signal to the audio switch 120. In accordance with the user's channel selection, for example, the audio switch 120 selectively outputs one of the two digital audio signals supplied from the video/audio decoders 102a and 102b. Thereafter, the audio DAC 122 converts the digital audio signal into an analog audio signal and then outputs the analog audio signal through an output terminal 123.

Thanks to the functions of the audio processor 121, there are no limits on the digital audio signals to be processed by the video/audio decoder 102b. Thus, circuits for the video/audio decoder 102b may be picked from a broader range during the manufacturing process and the signal processing chip 100 can be made up (e.g., designed) more flexibly.

Hereinafter, the configuration of the signal processing chip 100 will be described along the processing path of an analog broadcast signal to be written. The signal processing chip 100 receives the video signal of the analog broadcast signal (i.e., an analog video signal) at an input terminal 101c and an analog audio signal at an input terminal 101d, respectively.

A video analog-to-digital converter (video ADC) 140 samples and quantizes the analog video signal in response to the clock signal CLK(a) supplied from the clock generator 103a, thereby converting the analog video signal into a digital video signal. The resultant video signal is passed to a video encoder 141. In response to the clock signal CLK(a) supplied from the same clock generator 103a, the video encoder 141 acquires video data from the video signal, and subjects it to encoding process according to a format complying with the MPEG-2 standards. As described above, the video encoder 141 generates a PS if the optical disc drive is loaded with a DVD 31a and a TS if the optical disc drive is loaded with a BD 31b, respectively.

On the other hand, an audio analog-to-digital converter (audio ADC) 150 samples and quantizes the analog audio signal in response to the master clock signal MCK(a), thereby converting the analog audio signal into a digital audio signal. In addition, in response to the same master clock signal MCK (a), the audio ADC 150 further generates an LR clock signal LRCK for distinguishing the right and left halves of the stereo serial signal of the digital audio signal generated and a bit clock signal BCK for identifying the bits of a serial audio signal. These clock signals MCK(a), BCK and LRCK are transmitted to the audio processor 121 and used as system reference clock pulses.

In the signal processing chip 100 described above, just the video/audio decoders 102a and 102b are provided for the purpose of processing the incoming PS and TS, respectively. However, after having been output from the video/audio decoders 102a and 102b, the video signals are processed by the same video controller 110 and same video DAC 113 in common, and the audio signals are processed by the same audio switch 120 and audio DAC 122 in common. In this manner, the number of circuit components required can be reduced, thus cutting down the cost and power dissipation significantly. In addition, since the same clock signal can be used in common, the transmission lines do not have to be extended so much, thus posing much less obstacles to other circuit components to be laid out during a design process. Furthermore, since the wire length can also be shortened, unwanted radiation within the circuit can be reduced as well.

In the example described above, the video controller 110 includes the video switch 111 and video processor 112. However, this configuration of the video controller 110 is just an example and may be modified according to the contents of the video processing required. Hereinafter, alternative configurations will be described with reference to FIGS. 5 and 6. In both of the examples illustrated in FIGS. 5 and 6, two types of videos need to be input in parallel. Accordingly, the following configurations can be used effectively in a situation where the optical disc drive 30 is acquiring a PS from a DVD and a TS from a digital broadcast received, respectively. To make the points easily understandable, FIGS. 5 and 6 extract only the video/audio decoders 102a and 102b and video controller 110 from various types of circuit components shown in FIG. 4.

Figure 5:
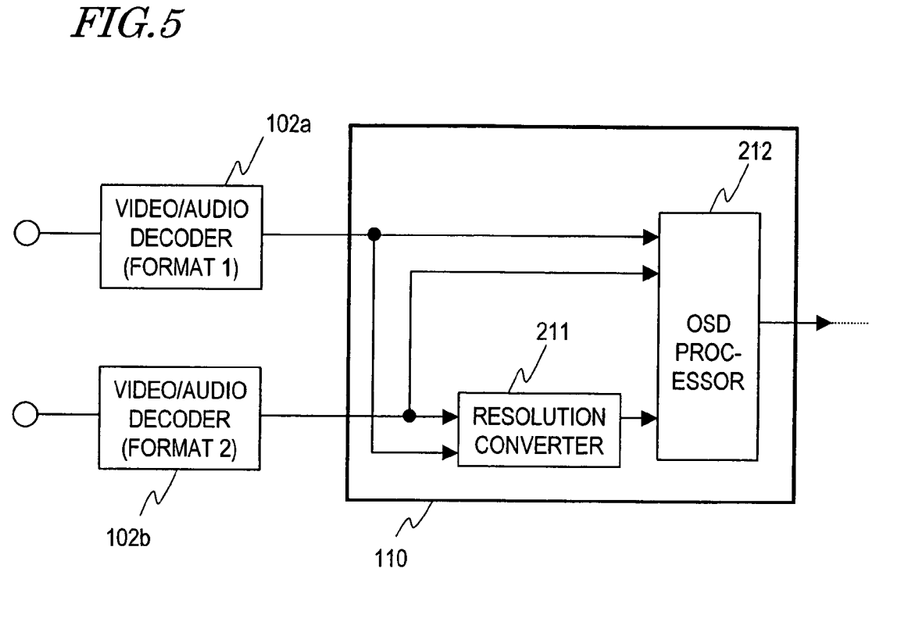
FIG. 5 is a diagram showing a configuration for a video controller 110 enabling a picture-in-picture display.

FIG. 5 shows a configuration for a video controller 110 enabling a picture-in-picture display. The "picture-in-picture display" is a display method in which a small picture is superimposed on another background picture being presented on the full screen. The video controller 110 includes a resolution converter 211 and an OSD processor 212. The resolution converter 211 receives a video signal representing a PS to be presented as the small picture from the video/audio decoder 102a and subjects it to video downsizing processing by decimating the acquired video data, for example. The downsized video signal is input to the OSD processor 212. On the other hand, the video data of the TS supplied from the video/audio decoder 102b is input to the OSD processor 212 as it is.

The OSD processor 212 superimposes the downsized PS video signal, supplied from the resolution converter 211, on the full-screen-presentable TS video signal. Also, the OSD processor 212 further adds another video signal, representing letters, an icon or any other symbol that tells the viewer that the picture-in-picture display is currently ON, to the video signal with the superimposition. The resultant synthesized video signal is output by way of the video DAC 113 and video output terminal 114.

Figure 6:
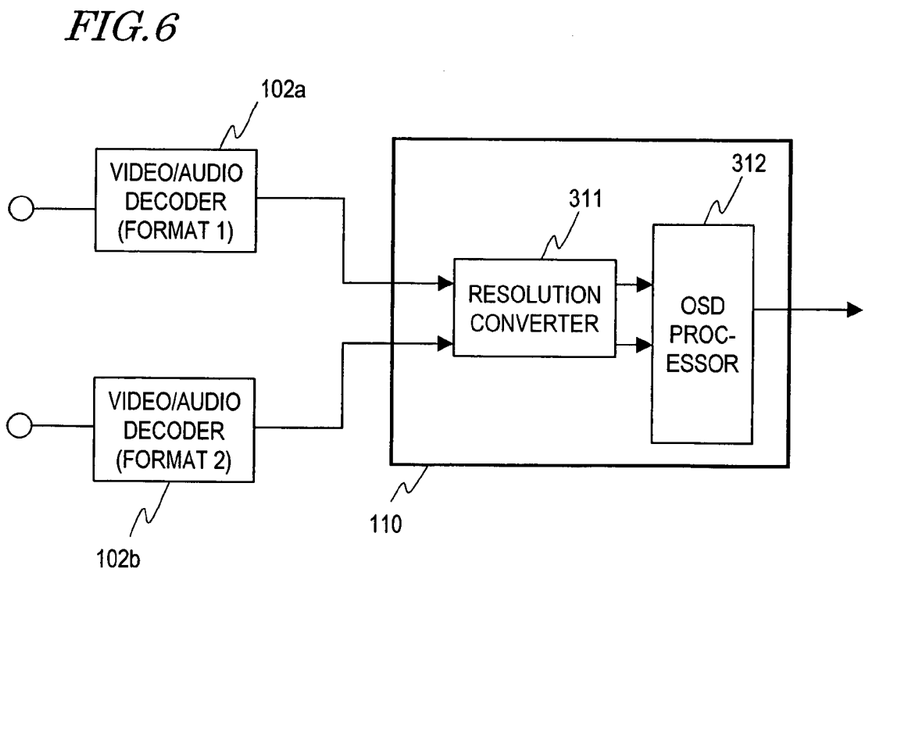
FIG. 6 is a diagram showing a configuration for a video controller 110 enabling a thumbnail display.

FIG. 6 shows a configuration for a video controller 110 enabling a thumbnail display. The "thumbnail display" is a display method in which downsized pictures from a plurality of sources are presented so as to be viewable as a list. The video controller 110 includes a resolution converter 311 and an OSD processor 312. The resolution converter 311 receives the PS and TS from the video/audio decoders 102a and 102b, respectively, and performs downsizing processing on both of these. When finishing this downsizing processing, the resolution converter 311 outputs the downsized PS and TS video signals to the OSD processor 312. In response, the OSD processor 312 performs a synthesis process so as to present the received video signals at predetermined locations on the screen. By using its OSD functions, the OSD processor 312 synthesizes the thumbnail pictures with text letters indicating the sources of the pictures. The resultant synthesized video signal is output by way of the video DAC 113 and video output terminal 114.

In the configurations shown in FIGS. 5 and 6, the resolution converter and OSD processor are provided as two separate circuits and part or all of this converter or processor is used in common, thus coping with a broader variety of video display demands as is clear from the foregoing description. However, these processing functions just need to be provided for the circuits that are already used in common in the video controller 110 shown in FIG. 4. Thus, there is no need to add any new circuits and the circuit size never increases as a result.

Preferred embodiments of the present invention have been described as being applied to a PS and a TS. However, the present invention is in no way limited to those specific preferred embodiments. Alternatively, encoded digital video/audio signals complying with MPEG-4 or DV may also be used, for example. And any other type of digital video/audio signals can be used as well.

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

What is claimed is:

1. A signal processor, which receives an encoded digital signal and generates signals to reproduce video and audio from the received digital signal, the signal processor comprising:

a first decoder for separating a first video signal and a first audio signal in digital form from a digital signal in a first format;

a second decoder for separating a second video signal and a second audio signal in digital form from a digital signal in a second format;

a video controller, which receives the first video signal and the second video signal, selects at least one of the two video signals received, subjects the selected video signal to video processing for display purposes, and then outputs the processed video signal;

a clock generator for generating a clock signal of which the frequency corresponds to that of the first audio signal;

an audio processor, which receives the second audio signal and the clock signal and converts the frequency of the second audio signal into that of the first audio signal in accordance with the clock signal; and an audio switch, which receives the first audio signal from the first decoder and the second audio signal with the converted frequency from the audio processor, respectively, and outputs one of the two audio signals that is associated with the video signal being selected by the video controller.

2. The signal processor according to claim 1, wherein the video controller includes:

a video switch, which receives the first video signal and the second video signal and selectively outputs at least one of the two video signals; and a video processor, which subjects the selected video signal to the video processing for display purposes and then outputs the processed video signal.

3. The signal processor according to 1, wherein the video controller includes:

a resolution converter, which receives one of the first video signal and the second video signal to convert resolution of the video; and a processor, which receives the video signal with the converted resolution and the other video signal, and subjects the two video signals to video processing for superimpose display purposes, and then outputs a processed video signal.

4. The signal processor according to 1, wherein the video controller includes:

a resolution converter, which receives the first video signal and the second video signal to convert resolutions of the first and the second video signals; and a processor, which subjects the first and second video signals with the converted resolutions to video processing for simultaneous display purposes, and then outputs a processed video signal.

* * * * *